Patented Oct. 25, 1932

1,884,747

UNITED STATES PATENT OFFICE

PAUL KNAPP, OF WILMINGTON, DELAWARE, ASSIGNOR TO E. I. DU PONT DE NEMOURS & COMPANY, OF WILMINGTON, DELAWARE, A CORPORATION OF DELAWARE

PLASTIC COMPOSITION

No Drawing.   Application filed January 10, 1929. Serial No. 331,722.

This invention relates to plastic compositions and more particularly to resinous compositions obtained by the condensation of a mixture of phenol and a phenol aldehyde condensate with furfural.

The manufacture of the condensation products from phenol and furfural is, of course, well known. As usually carried out approximately equal quantities of furfural and phenol are mixed to form a thin liquid and a catalyst, usually aqueous HCl, is added. The condensation is then allowed to proceed to obtain a black resin. This condensation, however, is difficult to control, especially in large quantities and as a consequence the product is likely to become hard before it can be properly worked. Moreover, it has the objectionable property of shrinking to a very considerable degree when heated to 60°–135° C. and as a result frequently cracks or exhibits internal stresses after exposure to heat.

One of the principal objects of the present invention is the manufacture of a resinous composition which when mixed with an acid catalyst gradually hardens on standing but which will remain in a plastic condition for a sufficient time to permit of its being readily worked with a trowel. Another object is the production of a plastic material which will harden to form a body highly resistant to hot solvents and acids but which sets with so little shrinkage that practical application of the material to a variey of purposes is made possible. A further object is the preparation of a material containing all the ingredients required for the formation of a resin and which material may be kept in convenient form without setting until it is to be used, when a catalyst is added and the process of setting is initiated.

With these objects in view I have discovered that if a mixture of a phenolic body and a phenolic-aldehyde condensate, instead of phenol alone, is condensed with furfural a product having the desired properties is obtained.

In order to disclose my invention in detail the following example of the procedure to be followed for the production of the product in a preferred form is furnished. It will be understood, however, that this example is furnished by way of illustration only and that it is not my intention to be limited to the particular reaction, conditions, proportions or reagents therein set forth.

Example 1

Into a suitable vessel 105 lbs. of commercial formaldehyde solution are added gradually to 210 lbs. of phenol and 15 lbs. of aqueous HCl and any vapors tending to pass off are condensed and refluxed to the reaction vessel. Much heat is formed as the formaldehyde is added and this addition should not be any more or less rapid than to maintain a gentle boiling. After the formaldehyde is all added, the mass is allowed to cool and then to stand 24 hours. The supernatant aqueous layer is decanted from the viscous resinous mass. The latter is a mixture of phenol and phenol-formaldehyde condensation products, probably mostly phenol-alcohol. This mass is neutralized with $CaCO_3$ and 140 lbs. of furfural are added. The mass is agitated and then filtered through glass wool. This mixture is a varnish-like liquid and for certain purposes may be employed in this form. To form a plastic it is readily mixed with 20–30% by weight of acid washed asbestos to form a paste varying in stiffness according to the amount of asbestos used. This paste is made up to the desired stiffness and is kept in a closed vessel until used. Prepared and kept in this way, the mixture or the varnish remains unchanged indefinitely.

The next step is to make up the necessary acid catalyst. This is done by adding 70 lbs. of concentrated $H_2SO_4$ to 30 lbs. of ethyl alcohol with good cooling and stirring. This mixture may be kept in stoppered bottles or carboys.

When it is desired to use the paste the following procedure is carried out. Ten pounds of the paste are weighed out and five tenths pound of the acid catalyst is added to it and the whole is very thoroughly mixed. A slight warming is noticed and the mass gradually becomes stiff but is workable for about an hour. During this time it may be applied as desired.

In cases where a filler is used, in place of asbestos any of the ordinary fillers which are resistant to heat and acids as, for example, ground quartz, infusorial earth and silicates generally may be employed. These materials may of course be employed in varying amounts depending on the viscosity desired. If ground quartz or infusorial earth is employed, quantities ranging from 50 to 70% by weight of the varnish have been found suitable.

The phenol phenol-formaldehyde condensation product of furfural prepared in any of the various ways indicated above and containing a filler can be troweled and worked with the greatest ease. After a period of time which depends upon the strength and amount of the acid catalyst, the mixture sets and, in a few days or in a few hours if the mass is heated, is converted into a resinous composition highly resistant to the action of hot solvents and acids. This hardening process is accompanied with such a little shrinkage that the composition may be used with advantage as a coating composition, filling material or a cement.

Thus, it may be applied with a spatula or trowel to a rough iron surface and allowed to set to form a protective coating on the iron. Or the paste may be introduced with a trowel into bell-shaped pipe joints where upon setting it forms a durable and tight joint. The hardening process may of course be accelerated by heat.

Also the paste is adapted for use in moulds as a moulding composition or may be spread on a mandril and there allowed to set.

The varnish obtained according to the example prior to the admixture of a filler such as asbestos is also adapted for use in other ways than in combination with a dispersed filler. Thus the varnish may be placed in a suitable vessel and the body to be treated therewith such as paper or cloth run through or soaked in the mixture to coat or impregnate the body. If paper or cloth is employed, the impregnated layers may be superimposed and pressed into flat sheets before the varnish is permitted to set. Or the impregnated article may be wound into rods or tubes on a mandril and the whole heat treated. The mandril may then be forced out and leave the article desired. The catalyst may be added to the varnish, when so employed, before the impregnating step or the coated or impregnated material may be treated with the catalyst after impregnation and either before or after the article is shaped in final form.

It will be understood in connection with the above example that I may vary the proportions of the ingredients between wide limits. For example, instead of using 210 lbs. of phenol and 105 lbs. of formaldehyde solution I may use phenol and aldehyde in such ratios as to leave a substantial amount of uncombined phenol in the product. In the preferred embodiments, I may use 210 lbs. of phenol and 25-175 lbs. of commercial formaldehyde solution. Instead of using 140 lbs. of furfural, I may use widely varying amounts of furfural. It will also be understood that the use of an acid in the aldehyde-phenol condensation is not essential. Almost any acid, alkali or neutral salt may be used here as is well known. Instead of using 5% of the acid catalyst in the final step, I may use 1-30%. Instead of making up the acid catalyst as herein described I may use any one or combination of a great variety of catalysts, such as alcoholic HCl, aqueous HCl, or $H_2SO_4$, aniline hydrochloride, or iron chloride. These variations each serve to change the properties of the mixtures and they show the adaptability of the invention for making up mixtures to meet different working conditions.

Also, it should be understood that, instead of phenol I can use cresol, and that the term "phenolic body" can be construed as applying to any phenolic body adapted to condense with an aldehyde to give a resinous substance, for example any hydroxy-aryl compound having an unsubstituted position either ortho or para to an hydroxy group including such substances as beta-naphthol, chlorphenol, hydroquinone and guaiacol.

Instead of formaldehyde I may use any of its common polymers or simple derivatives such as hexamethylenetetramine or I may use acetaldehyde, butryaldehyde, acrylic aldehyde, or any aldehyde or aldehyde-forming body which combines with phenol to form a resin. I may also use, instead of formaldehyde, the following specific materials which combine with phenol:

Sulfur, methyl-ethyl ketone, acetone, glucose, starch, cellulosic bodies, glycerine and sucrose or any other body which resinifies with phenol.

As many apparently widely different embodiments of this invention may be made without departing from the spirit thereof, it is to be understood that I do not limit myself to the foregoing examples or description except as indicated in the following patent claims.

I claim:

1. The process of forming a self-hardening composition which comprises mixing 25 to 175 parts of formaldehyde and about 210 parts of a phenol under refluxing conditions, allowing the reaction mass to cool, separating the water formed, neutralizing, adding about 140 parts of furfural, adding 20-30% by weight of a filler and adding 1 to 30% of a product which is obtainable by mixing about 70 parts of concentrated sulphuric acid and about 30 parts of ethyl alcohol with cooling and stirring.

2. A product which is obtainable by mixing 25 to 175 parts of formaldehyde and about 210 parts of a phenol under refluxing conditions, allowing the reaction mass to cool, separating the water formed, neutralizing, adding about 140 parts of furfural, adding 20–30% of a filler and adding 1 to 30% of a product which is obtainable by mixing about 70 parts of concentrated sulphuric acid and about 30 parts of ethyl alcohol with cooling and stirring.

3. A product which is obtainable by mixing 25 to 175 parts of formaldehyde and about 210 parts of a phenol under refluxing conditions, allowing the reaction mass to cool, separating the water formed, neutralizing, adding about 140 parts of furfural, adding 20–30% of asbestos filler and adding 1 to 30% of a product which is obtainable by mixing about 70 parts of concentrated sulphuric acid and about 30 parts of ethyl alcohol with cooling and stirring.

4. A product which is obtainable by mixing 25 to 175 parts of formaldehyde and about 210 parts of a phenol under refluxing conditions, allowing the reaction mass to cool, separating the water formed, neutralizing, adding about 140 parts of furfural, adding 20–30% of silica filler and adding 1 to 30% of a product which is obtainable by mixing about 70 parts of concentrated sulphuric acid and about 30 parts of ethyl alcohol with cooling and stirring.

In testimony whereof, I affix my signature.

PAUL KNAPP.